(No Model.)
F. G. & A. C. SARGENT.
PLATE HOLDER FOR PHOTOGRAPHERS' CAMERAS.
No. 289,029. Patented Nov. 27, 1883.
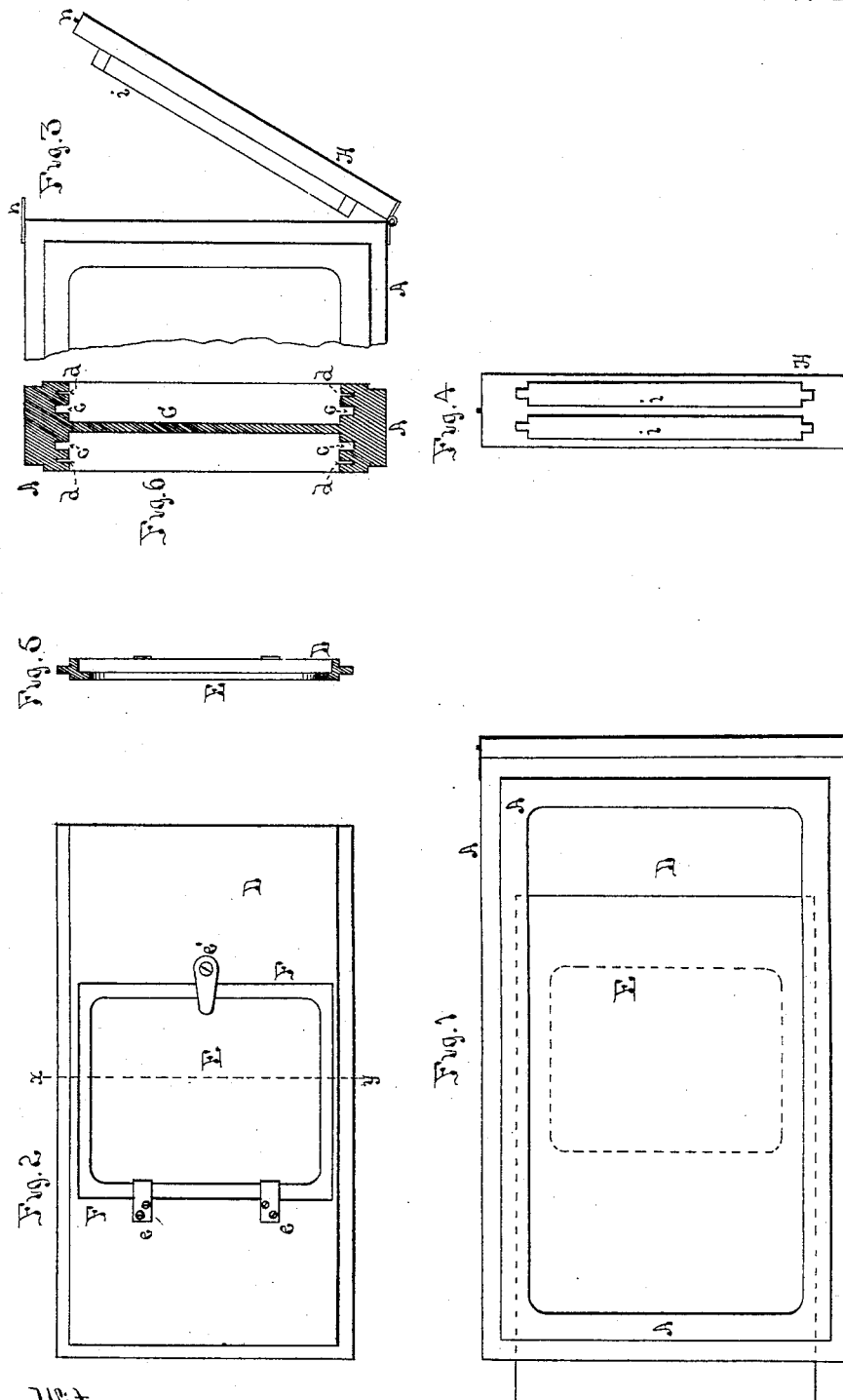
Witnesses
N. P. Ockington.
C. E. Wettergreen.
Inventor,
Frederick G. Sargent
Allan C. Sargent
By David Hawkes
Their Atty.

UNITED STATES PATENT OFFICE.

FREDERICK G. SARGENT AND ALLAN C. SARGENT, OF GRANITEVILLE, MASS.

PLATE-HOLDER FOR PHOTOGRAPHERS' CAMERAS.

SPECIFICATION forming part of Letters Patent No. 289,029, dated November 27, 1883.

Application filed October 21, 1882. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Plate-Holders for Photographers' Cameras, of which the following is a specification.

Our invention relates to plate-holders for photographers' cameras; and it consists in the introduction into the holder of a secondary slide having an aperture substantially central within it, and of the suitable size for a smaller plate, said aperture being of smaller size than the ordinary opening in the holder, so as to permit of the taking of a smaller negative with the same holder and apparatus conveniently, and without the use of a different-size holder and without materially altering the capacity of the holder for taking larger pictures.

In the drawings, Figure 1 is a side view of a camera-plate holder. Fig. 2 is a side view of the supplementary slide constructed according to our invention. Fig. 3 is a view of a portion of the upper end, shown in Fig. 1 with the cover partially open. Fig. 4 is a bottom view of the cover at the end which holds in place the plates or slides. Fig. 5 is a section through Fig. 2 on dotted line $x\ y$. Fig. 6 is a section of Fig. 1, transversely through it.

In the ordinary camera-plate holder a central sliding partition has on each side of it the sliding camera-plate of the full size of the inside frame of the holder, to expose the entire plate to the object to be taken. The plate is inserted on either side of the central partition in suitable grooves, and is withdrawn by sliding it out of the grooves. Over each outside face of the opposite camera-plates is slid a cover to protect the plate from the light, except while the picture is being taken.

A is the frame of the camera-plate holder.

B is the outside sliding cover to exclude the light. This is shown as partially withdrawn in Fig. 1. Through the center of the holder we place the fixed partition C, Fig. 6, dividing it into two compartments, one on each side of the partition, which fills the entire space lengthwise within the frame A. Next in front of this, the camera-plate is slid into the grooves $c\ c$, the outer cover, B, being slid into the grooves $d\ d$. When a full-size picture is to be taken, the ordinary plate is used in front of the partition C, allowing the light to reach it over the entire space inside the frame A. If, however, it is desired with the large camera-plate holder to take a picture of smaller size, we employ in place of this large plate the slide D, having at its center an aperture, E, of the smaller size of picture we wish to take. This aperture E is covered by the smaller plate F, which is held in place by the clips $e\ e$ and the button $e'$, as shown in Fig. 2. The position of the aperture E of the slide D, when in place in the holder, is shown by the dotted line in Fig. 1, and should be central to the camera. By the use of the slide D we are enabled to take pictures of different sizes upon plates less than the entire capacity of the holder, and with the same facility as in a holder fitted to the size of the smaller plate, thus saving the expense and trouble of having different sizes of holders for different plates.

H is a hinged cover for holding the camera-plates in place when they are inserted in the holder. Two projections, $i\ i$, on the lower side of this cover, bear against the plates or slides carrying the plates, and keep them from moving in the holder. The projections may be made of elastic materials, if desired, either in whole or where their surfaces bear upon the plate-slides. The cover H is secured, when closed, by a catch, $h$, engaging with the stud $n$ on the cover in the ordinary way.

What we claim as new and of our invention is—

In combination with a plate-holder for cameras, the slide D, provided with the aperture E, and means for holding the camera-plate in place against the same, substantially as described.

F. G. SARGENT.
A. C. SARGENT.

Witnesses:
ARTHUR B. PLIMPTON,
ARTHUR WRIGHT.